US012405690B2

(12) United States Patent
Nam et al.

(10) Patent No.: US 12,405,690 B2
(45) Date of Patent: Sep. 2, 2025

(54) TOUCH DRIVING DEVICE FOR DRIVING TOUCH PANEL

(71) Applicant: LX SEMICON CO., LTD., Daejeon (KR)

(72) Inventors: Jeong Kwon Nam, Daejeon (KR); Yeon Ju Yu, Daejeon (KR); Jin Yoon Jang, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/503,029

(22) Filed: Nov. 6, 2023

(65) Prior Publication Data

US 2024/0152232 A1 May 9, 2024

(30) Foreign Application Priority Data

Nov. 7, 2022 (KR) ........................ 10-2022-0147010

(51) Int. Cl.
*G06F 3/041* (2006.01)
*G06F 3/044* (2006.01)

(52) U.S. Cl.
CPC ........ *G06F 3/04166* (2019.05); *G06F 3/0412* (2013.01); *G06F 3/044* (2013.01)

(58) Field of Classification Search
CPC .... G06F 3/04166; G06F 3/0412; G06F 3/044; G06F 3/0443; G06F 3/03547; G06F 3/0446; G06F 3/0416; G06F 3/046; H03K 7/08
See application file for complete search history.

(56) References Cited

U.S. PATENT DOCUMENTS

| | | | | |
|---|---|---|---|---|
| 8,429,439 | B2* | 4/2013 | Asmanis | H04L 25/03878 348/192 |
| 10,845,931 | B2* | 11/2020 | Kang | G06F 3/0443 |
| 2009/0127005 | A1* | 5/2009 | Zachut | G06F 3/0446 178/18.03 |
| 2012/0075220 | A1* | 3/2012 | Matsui | G06F 3/04166 345/173 |
| 2017/0090624 | A1* | 3/2017 | Kwon | G06F 1/3262 |
| 2017/0090673 | A1* | 3/2017 | Kim | G06F 3/0418 |
| 2019/0187828 | A1* | 6/2019 | Hosur | G06F 3/044 |
| 2019/0187854 | A1* | 6/2019 | Hosur | G06F 3/04144 |
| 2020/0401258 | A1* | 12/2020 | Kang | G06F 3/04164 |
| 2022/0206626 | A1 | 6/2022 | Jang et al. | |
| 2024/0152232 | A1* | 5/2024 | Nam | G06F 3/0443 |

OTHER PUBLICATIONS

Extended European Search Report issued for European Patent Application No. 23208120.8 issued on Mar. 21, 2024, 8 pages.

* cited by examiner

*Primary Examiner* — Benyam Ketema
(74) *Attorney, Agent, or Firm* — ROTHWELL, FIGG, ERNST & MANBECK, P.C.

(57) ABSTRACT

One embodiment provides a touch driving device for driving a touch panel that generates an auxiliary signal using a voltage source and a resistor, and generates a touch driving signal by combining the auxiliary signal and PWM driving pulses. Such touch driving device may change the voltage level of the voltage source or change the resistance value of the resistor to compensate for the characteristic deviation between channel circuits.

19 Claims, 10 Drawing Sheets

TOUCH DRIVING DEVICE FOR DRIVING TOUCH PANEL

CROSS-REFERENCE TO RELATED APPLICATIONS

This application claims priority to and the benefit of Korean Patent Application No. 10-2022-0147010, filed on Nov. 7, 2022, the disclosure of which is incorporated herein by reference in its entirety.

TECHNICAL FIELD

This disclosure relates to touch driving technology for driving a touch panel, and more particularly, to a touch driving device for driving a touch panel.

BACKGROUND

Technology that recognizes external objects that are close to or touching the touch panel is referred to as touch driving technology.

The touch panel is placed in the same position as the display panel on the plane, allowing users to input user operation signals through the touch panel while viewing the image on the display panel.

This method of generating user manipulation signals provides surprising user intuition compared to other previous user manipulation signal input methods—for example, mouse input methods or keyboard input methods.

According to these advantages, touch driving technology is being applied to various electronic devices including display panels.

The touch driving device can sense the touch or proximity of the external objects to the touch panel by transmitting a driving signal to a touch electrode disposed on the touch panel and receiving a response signal formed in the touch electrode.

Meanwhile, for the convenience of the user as described above, the touch panel and the display panel are located close to each other, and accordingly, a parasitic capacitor is formed between the touch electrode and the display electrode. These parasitic capacitors cause problems such as lowering the sensitivity of touch sensing and increasing the voltage level of the signal used for touch driving.

DISCLOSURE OF THE INVENTION

Technical Problem

The present disclosure is to provide a technology that minimizes the influence of parasitic capacitors formed around the touch electrode.

Technical Solution

According to the present disclosure, a touch driving device may comprise a first channel circuit configured to supply a plurality of first touch driving pulses being a curved waveform in accordance with a first RC time constant to a first touch electrode, and generate touch sensing data for the first touch electrode according to a response signal for the plurality of first touch driving pulses; and a second channel circuit configured to supply a plurality of second touch driving pulses being a curved waveform in accordance with a second RC time constant to a second touch electrode, and generate touch sensing data for the second touch electrode according to a response signal for the plurality of second touch driving pulses.

According to the present disclosure, a touch driving device may comprise a first circuit configured to output Pulse Width Modulation (PWM) driving pulses; a second circuit configured to generate touch driving pulses by adding an auxiliary signal generated based on a voltage source and a resistive element to the PWM driving pulses, supply the touch driving pulses to the touch electrode, and generate and output touch sensing data in response to a response signal of the touch electrode; and a third circuit configured to analyze the touch sensing data and generate touch coordinates for the touch panel.

Effect of the Invention

According to the present disclosure, the sensitivity of touch sensing may be enhanced by reducing the impact of parasitic capacitors formed in the vicinity of the touch electrode.

DETAILED DESCRIPTION OF THE INVENTION

Figure 1:
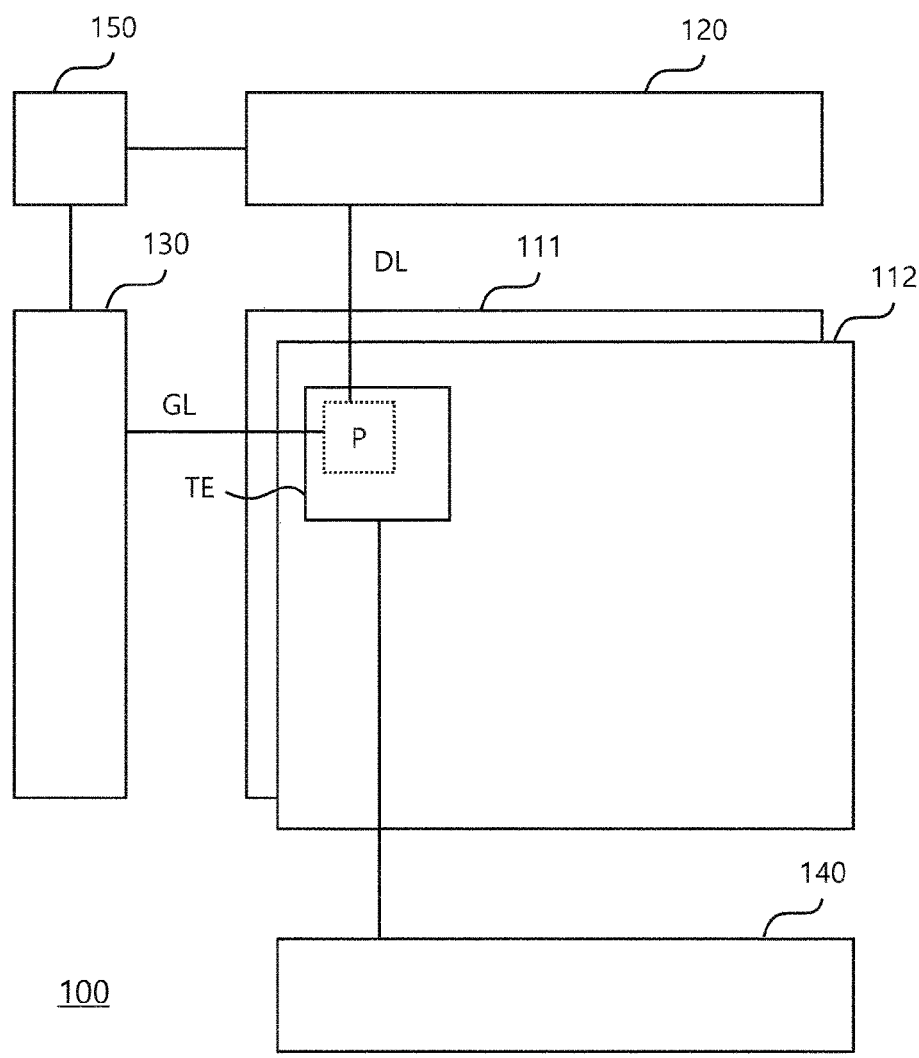
FIG. 1 is a configuration diagram of a display device according to an embodiment.

FIG. 1 is a configuration diagram of a display device according to an embodiment.

Referring to FIG. 1, the display device 100 may include a display panel 111, a touch panel 112, a data driving device 120, a gate driving device 130, a touch driving device 140, and a data processing device 150, etc.

In the display panel 111, a plurality of data lines (DL) connected to the data driving device 120 may be formed, and a plurality of gate lines (GL) connected to the gate driving device 130 may be formed. Additionally, a plurality of pixels (P) corresponding to intersection points of the plurality of data lines (DL) and the plurality of gate lines (GL) may be defined in the display panel 111.

In each pixel (P), a transistor may be formed in which a first electrode (e.g., source electrode or drain electrode) may be connected to the data line (DL), a gate electrode may be connected to the gate line (GL), and a second electrode (e.g., a drain electrode or source electrode) may be connected to a display electrode.

The touch panel 112 may be located on one side—the upper or lower side—of the display panel 111, and a plurality of touch electrodes (TEs) may be disposed on the touch panel 112.

The display panel 111 and the touch panel 112 may be positioned separately from each other. For example, the panel may be manufactured in such a way that the touch panel 112, which is formed according to a separate process, may be attached to the display panel 111. A panel known as an add-on type may be an example of such a panel.

The data driving device 120 may supply a data signal to the data line (DL) to display a digital image in each pixel of the display panel 111.

The data driving device 120 may include at least one data driver integrated circuit, and the at least one data driver integrated circuit may be connected to a bonding pad of the display panel 111 using a tape automated bonding (TAB) method or a chip on glass (COG) method, or may be formed directly on the display panel 111. In some cases, the at least one data driver integrated circuit may be formed by being integrated into the display panel 111. Additionally, the data driving device 120 may be implemented in a chip on film (COF) method.

The gate driving device 130 may sequentially supply scan signals to the gate line (GL) to turn on or off the transistors located in each pixel.

Depending on the driving method, the gate driving device 130 may be located on only one side of the display panel 111 as shown in FIG. 1, or may be divided into two and located on both sides of the display panel 111.

Additionally, the gate driving device 130 may include at least one gate driver integrated circuit, and the at least one gate driver integrated circuit may be connected to the bonding pad of the display panel 111 using the TAB method or the COG method, or may be implemented as a Gate In Panel (GIP) type and formed directly on the display panel 111. In some cases, the at least one gate driver integrated circuit may be formed by being integrated into the display panel 111. Additionally, the gate driving device 130 may be implemented using the COF method.

The touch driving device 140 may supply a touch driving signal to the touch electrode (TE) and receive a response signal for the touch driving signal. Additionally, the touch driving device 140 may sense the touch or proximity of an external object to the touch panel 112 according to the response signal.

In FIG. 1, one touch driving device 140 is shown in the display device 100, but the display device 100 may include two or more touch driving devices 140.

Meanwhile, the display device 100 may adopt a capacitive touch method that recognizes the proximity or touch of an object by detecting changes in capacitance through the touch electrode (TE).

For example, the capacitive touch method may be divided into a mutual capacitance touch method and a self-capacitance touch method.

The mutual capacitance touch method, one type of capacitive touch method, may sense touch or proximity to the touch panel by supplying a touch drive signal to the driving electrode and receiving a response signal from a sensing electrode capacitively coupled to the driving electrode. In this mutual capacitance touch method, the value sensed by the sensing electrode may change depending on the proximity or touch of an object such as a finger or a pen, and the mutual capacitance touch method may use the sensed value from these sensing electrodes to determine the presence or absence of touch and touch coordinates.

The self-capacitance touch method, another type of capacitive touch method, may supply a touch driving signal to a touch electrode and then senses the touch electrode again. In the self-capacitance touch method, the driving electrode and the sensing electrode are not differentiated. In this self-capacitance touch method, the value sensed by the touch electrode varies depending on the proximity or touch of an object such as a finger or a pen. The self-capacitance touch method may use these sensing values to detect the presence or absence of a touch, touch coordinates, etc.

The display device 100 may adopt one of the two capacitive touch methods described above (i.e., the mutual capacitance touch method and the self-capacitance touch method). However, in this disclosure, for convenience of explanation, the embodiment will be described assuming that the self-capacitance touch method may be adopted.

The display device 100 may drive the touch electrode (TE) by distinguishing between a display section and a touch section. As an example, the touch driving device 140 of the display device 100 may not apply a touch driving signal to all or part of the touch electrode (TE) in a section in which a data signal is supplied.

Additionally, the display device 100 may drive the touch electrode (TE) without distinguishing between the display section and the touch section. As an example, the touch driving device 140 of the display device 100 may apply a driving signal to all or part of the touch electrode (TE) in a section where a data signal is supplied.

The data processing device 150 may supply various control signals to the data driving device 120, the gate driving device 130, and the touch driving device 140. The data processing device 150 may transmit a data control signal (DCS) that controls the data driving device 120 to supply data signals to each pixel (P) according to each timing, a gate control signal (GCS) to the gate driving device 130, or a sensing signal to the touch driving device 140. The data processing device 150 may be a timing controller (T-Con) or may perform other control functions including the timing controller.

Meanwhile, a parasitic capacitor may be formed between the touch electrode (TE) and the peripheral electrodes. When the display panel 111 and the touch panel 112 are located close to each other, the size of the parasitic capacitor may become larger.

Figure 2:
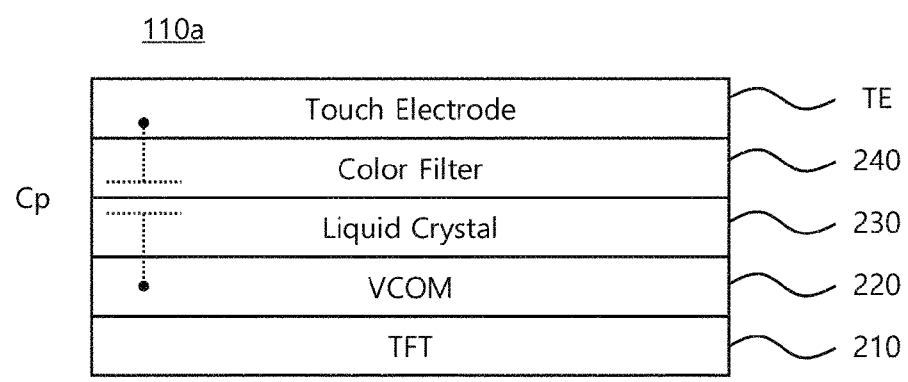
FIG. 2 is an example configuration diagram when a display panel according to an embodiment is composed of a Liquid Crystal Display (LCD) panel.

FIG. 2 is an example configuration diagram when a display panel according to an embodiment is composed of a Liquid Crystal Display (LCD) panel.

Referring to FIG. 2, the panel 110a may be composed of a display panel layer including a thin film transistor (TFT) substrate 210, a common electrode (VCOM) layer 220, a liquid crystal layer 230, and a color filter layer 240, and a touch panel layer including a touch electrode (TE).

A transistor and a pixel electrode disposed in a pixel may be disposed on the TFT substrate 210. A common electrode may be disposed on the common electrode layer 220. The TFT substrate 210 and the common electrode layer 220 may be combined and referred to as a display electrode layer.

The display electrodes—gate lines, data lines, common electrodes, etc.—may be disposed on the display electrode layer. In addition, the liquid crystal layer 230 and/or the color filter layer 240 may be interposed between the display electrode layer and the touch electrode (TE). The liquid crystal layer 230 and/or the color filter layer 240 may cause a parasitic capacitor (Cp) to be formed between the display electrode layer and the touch electrode (TE).

The touch driving signal formed in the touch electrode (TE) may be affected by the parasitic capacitor (Cp). The display device according to one embodiment may further supply an auxiliary signal to the touch electrode (TE) to minimize or reduce the parasitic capacitor (Cp).

Figure 3:
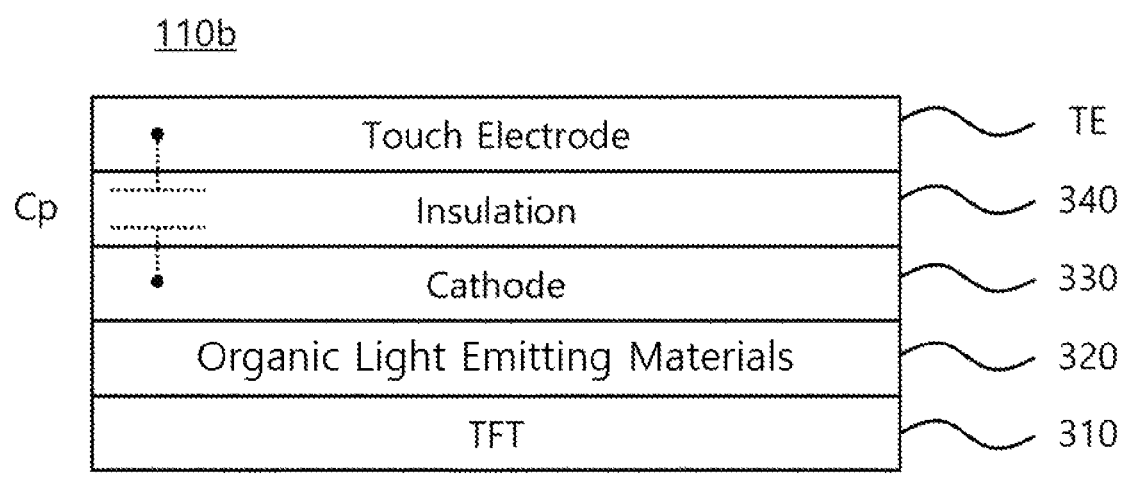
FIG. 3 is an example configuration diagram when a display panel according to an embodiment is composed of an Organic Light Emitting Diode (OLED) panel.

FIG. 3 is an example configuration diagram when a display panel according to an embodiment is composed of an Organic Light Emitting Diode (OLED) panel.

Referring to FIG. 3, the panel 110b may be composed of a display panel layer including a TFT substrate 310, an organic light emitting material layer 320, a cathode electrode layer 330, and an insulating layer 340, and a touch panel layer including a touch electrode (TE).

A transistor and an anode electrode disposed in a pixel may be disposed on the TFT substrate 310, and an organic light emitting material that emits light by electrical energy may be disposed on the organic light emitting material layer 320. Additionally, a cathode electrode that supplies a base voltage to the OLED may be disposed on the cathode electrode layer 330. The TFT substrate 310, the organic light emitting material layer 320, and the cathode electrode layer 330 may be combined and referred to as a display electrode layer.

Display electrodes—gate lines, data lines, anode electrodes, cathode electrodes, etc.—may be disposed on the display electrode layer. In addition, an insulating layer 340 may be interposed between the display electrode layer and the touch electrode (TE). The insulating layer 340 may cause a parasitic capacitor (Cp) to be formed between the display electrode and the touch electrode (TE).

The touch driving signal formed in the touch electrode (TE) may be affected by the parasitic capacitor (Cp). The display device according to one embodiment may further supply an auxiliary signal to the touch electrode (TE) to minimize or reduce the parasitic capacitor (Cp).

Meanwhile, the display panel and the touch panel may form an in-cell type panel that shares some configurations.

Figure 4:
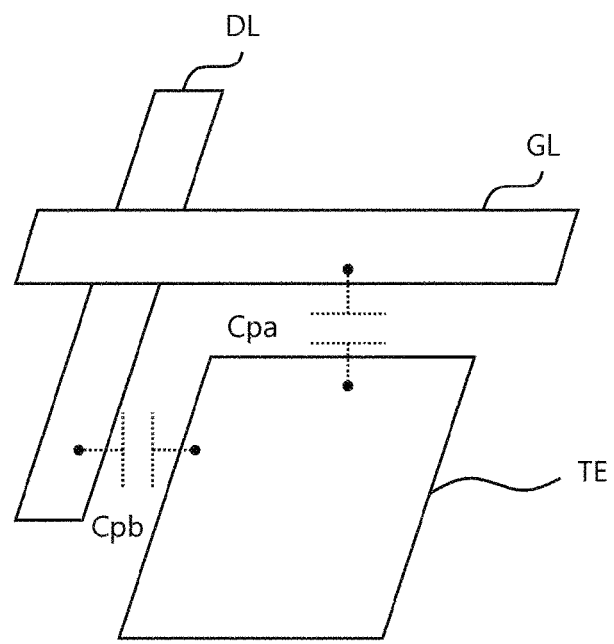
FIG. 4 is a diagram illustrating a formation of a parasitic capacitor when the display panel according to one embodiment is an in-cell type panel.

FIG. 4 is a diagram illustrating a formation of a parasitic capacitor when the display panel according to one embodiment is an in-cell type panel.

Referring to FIG. 4, the touch electrode (TE) may be located within the display panel.

When the display panel is an LCD panel, a common electrode supplied with a common voltage may be used as a touch electrode (TE). Also, when the display panel is an OLED panel, the cathode electrode to which the base voltage is supplied may be used as a touch electrode (TE).

When the touch electrode (TE) is located in the display panel, a first parasitic capacitor (Cpa) is formed between the touch electrode (TE) and the gate line (GL), and a second parasitic capacitor (Cpb) is formed between the touch electrode (TE) and the data line (DL).

The size of the first parasitic capacitor (Cpa) and the second parasitic capacitor (Cpb)—the capacitance size—may be much larger than that of the on-cell type panel.

When such a parasitic capacitor is formed, the sensitivity of touch sensing through the touch electrode may be lowered. The touch driving device according to one embodiment may further generate an auxiliary signal and supply the auxiliary signal to the touch electrode in order to minimize the influence of the parasitic capacitor.

Figure 5:
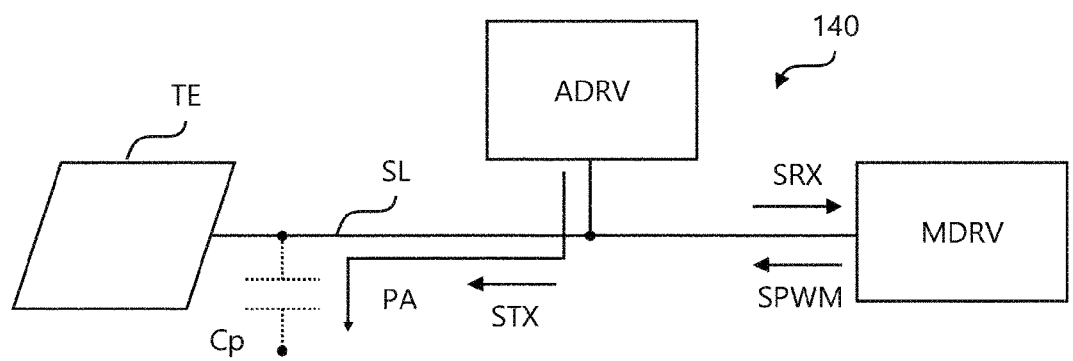
FIG. 5 is a diagram illustrating a process in which a touch driving device reduces the influence of a parasitic capacitor according to an embodiment.

FIG. 5 is a diagram illustrating a process in which a touch driving device reduces the influence of a parasitic capacitor according to an embodiment.

Referring to FIG. 5, the touch driving device 140 and the touch electrode (TE) may be connected through a sensing line (SL). The parasitic capacitor (Cp) may be modeled as being formed on the sensing line (SL).

The touch driving device 140 may include a main driving circuit (MDRV) and a driving support circuit (ADRV).

The main driving circuit (MDRV) may supply Pulse Width Modulation (PWM) driving pulses (SPWM) to the sensing line (SL). Additionally, the driving support circuit (ADRV) may supply an auxiliary signal (PA) to the sensing line (SL).

PWM driving pulses (SPWM) and auxiliary signal (PA) may be combined at the sensing line (SL) to form a touch driving signal (STX).

The touch driving device 140 may supply the touch driving signal (STX) to the sensing line (SL), and the auxiliary signal (PA) included in the touch driving signal (STX) may mainly charge or discharge the parasitic capacitor (Cp). In the prior art, the sensitivity of touch sensing was low because the PWM driving pulses (SPWM) also contributed to charging or discharging the parasitic capacitor (Cp), but in the present disclosure according to one embodiment, the auxiliary signal (PA) may mainly be used to charge or discharge the parasitic capacitor (Cp), and the PWM driving pulses (SPWM) may mainly contribute to driving the touch electrode (TE).

The main driving circuit (MDRV) may recognize the response signal (SRX) of the touch electrode (TE) through the sensing line (SL). Here, the response signal (SRX) may be mainly caused by PWM driving pulses (SPWM). The touch driving device 140 may sense the touch electrode (TE) with high sensitivity.

Figure 6:
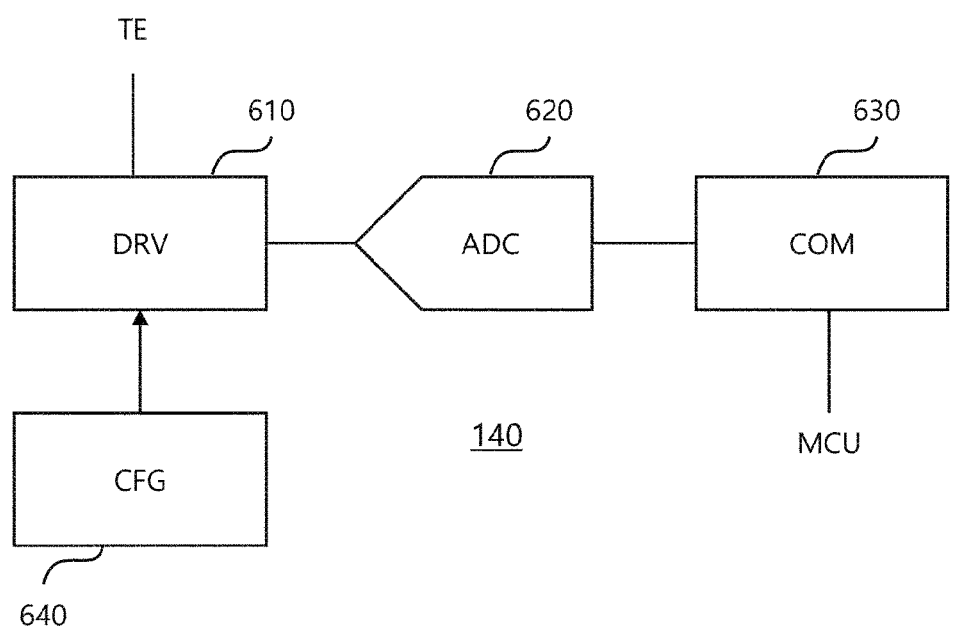
FIG. 6 is a configuration diagram of a touch driving device according to an embodiment.

FIG. 6 is a configuration diagram of a touch driving device according to an embodiment.

Referring to FIG. 6, the touch driving device 140 may include a touch driving circuit (DRV) 610, an analog-to-digital conversion circuit (ADC: Analog Digital Converter) 620, and a communication circuit (COM) 630, a configuration circuit (CFG) 640, etc.

The touch driving circuit 610 may supply a touch driving signal to the touch electrode (TE) while the touch electrode (TE) is connected. And, the touch driving circuit 610 may recognize the response signal of the touch electrode (TE).

The analog-digital conversion circuit (ADC) 620 may convert an analog signal according to the response signal of the touch electrode (TE) into touch sensing data.

And, the communication circuit 630 may transmit touch sensing data to a touch coordinate calculation device—for example, a main control unit (MCU). The touch coordinate calculation device may receive touch sensing data and analyze the touch sensing data to generate touch coordinates on the touch panel.

The touch driving circuit 610 may include a driving support circuit that generates an auxiliary signal using a voltage source and a resistive element. The configuration circuit 640 may adjust the settings of the driving support circuit by receiving a setting signal from an external device. For example, the configuration circuit 640 may adjust the voltage level of the voltage source and the resistance value of the resistive element.

Figure 7:
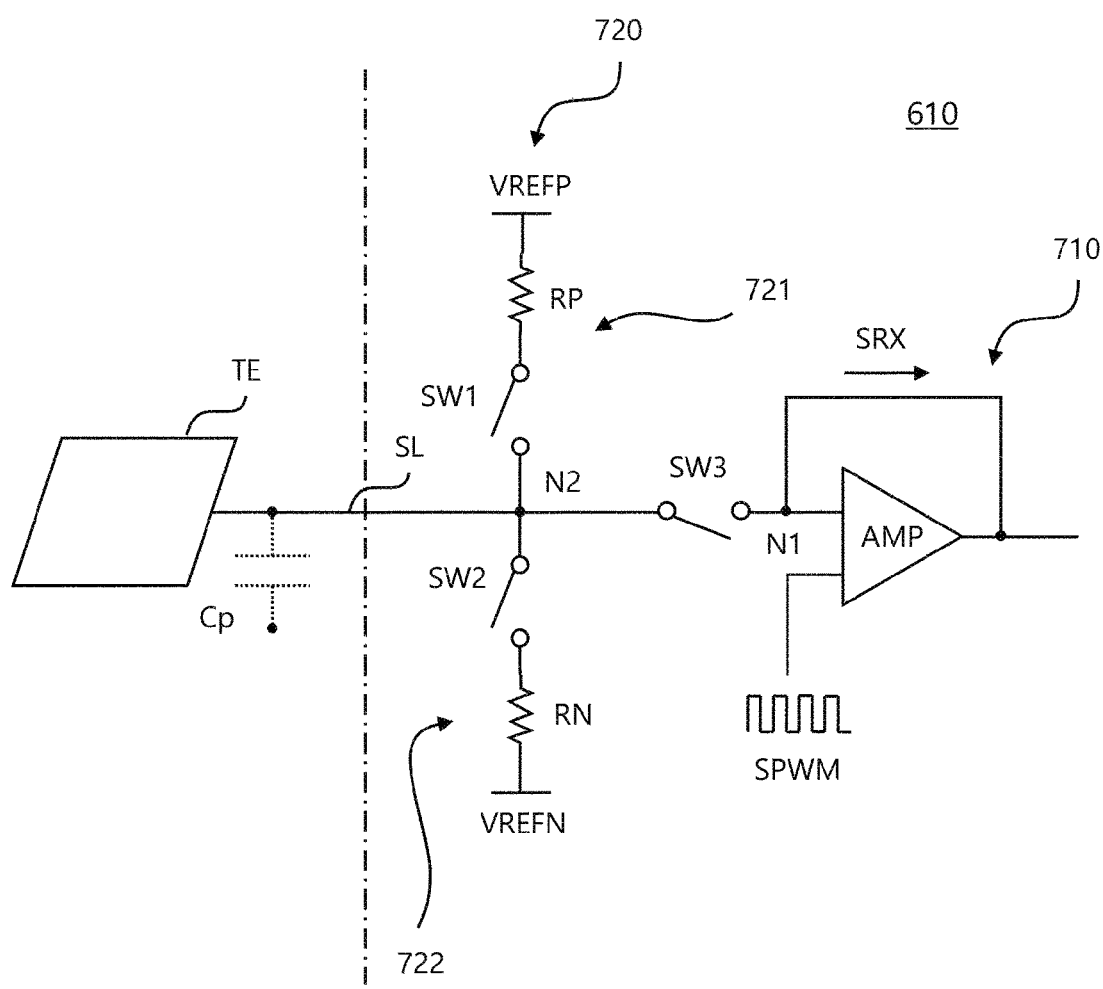
FIG. 7 is a configuration diagram of a touch driving circuit according to an embodiment.

FIG. 7 is a configuration diagram of a touch driving circuit according to an embodiment.

Referring to FIG. 7, the touch driving circuit 610 may include a main driving circuit 710, a driving support circuit 720, etc.

The main driving circuit 710 may supply PWM driving pulses (SPWM) to the first node (N1) of the sensing line (SL) connected to the touch electrode (TE).

The main driving circuit 710 may include an amplifier (AMP), and PWM driving pulses (SPWM) may be input to one input terminal of the amplifier (AMP). Also, according to the operating principle of the amplifier (AMP), PWM driving pulses (SPWM) may be formed at another input terminal of the amplifier (AMP). Here, PWM driving pulses (SPWM) may be supplied from an external.

Another input terminal of the amplifier (AMP) may be connected to the first node (N1), and according to this connection relationship, PWM driving pulses (SPWM) may be supplied to the first node (N1). And, the PWM driving pulses (SPWM) may be supplied to the touch electrode (TE) through the sensing line (SL).

A third switch (SW3) may be further disposed between the main driving circuit 710 and the touch electrode (TE). When supplying PWM driving pulses (SPWM) to the touch electrode (TE), the touch driving circuit 610 may turn on the third switch (SW3). When separating the main driving circuit 710 from the touch electrode (TE), the touch driving circuit 610 may turn off the third switch (SW3).

The driving support circuit 720 may be connected to the second node (N2) of the sensing line (SL). The second node (N2) may be formed between the touch electrode (TE) and the first node (N1) on the sensing line (SL). The driving support circuit 720 may supply an auxiliary signal to the second node (N2). The effect of the auxiliary signal on the response signal (SRX) according to the positional relationship between the first node (N1) and the second node (N2) may be minimized.

The driving support circuit 720 may be composed of a rising driving support circuit 721 including a high voltage source (VREFP) and a first resistance element (RP), and a falling drive support circuit 722 including a low voltage source (VREFN) and a second resistance element (RN).

The rising driving support circuit 721 may be driven according to the timing of the rising edge of the PWM driving pulses (SPWM). The rising driving support circuit 721 may be driven in some sections of the time period in which the PWM driving pulses (SPWM) may indicate a high voltage level. The rising driving support circuit 721 may minimize the contribution of PWM driving pulses (SPWM) to charging the parasitic capacitor (Cp) by supplying current to charge the parasitic capacitor (Cp).

In the rising driving support circuit 721, the first resistance element (RP) may form an RC circuit together with the parasitic capacitor (Cp). Accordingly, the waveform of the auxiliary signal may have a curved waveform based on the RC time constant. Additionally, the touch drive signal, which is a combination of the auxiliary signal and the PWM drive pulses (SPWM), may have a curved waveform due to the RC time constant in a part of the rising waveform.

The falling driving support circuit 722 may be driven according to the falling edge timing of the PWM driving pulses (SPWM). The falling drive support circuit 722 may be driven in some sections of the time period when the PWM drive pulses (SPWM) indicate a low voltage level. The falling drive support circuit 722 may minimize the contribution of the PWM drive pulses (SPWM) to discharging the parasitic capacitor (Cp) by supplying current to discharge the parasitic capacitor (Cp).

In the falling drive support circuit 722, the second resistance element (RN) may form an RC circuit together with the parasitic capacitor (Cp). Accordingly, the waveform of the auxiliary signal may have a curved waveform based on the RC time constant. In addition, the touch drive signal, which is a combination of the auxiliary signal and the PWM drive pulses (SPWM), may have a curved waveform due to the RC time constant in a part of the falling waveform.

Figure 8:
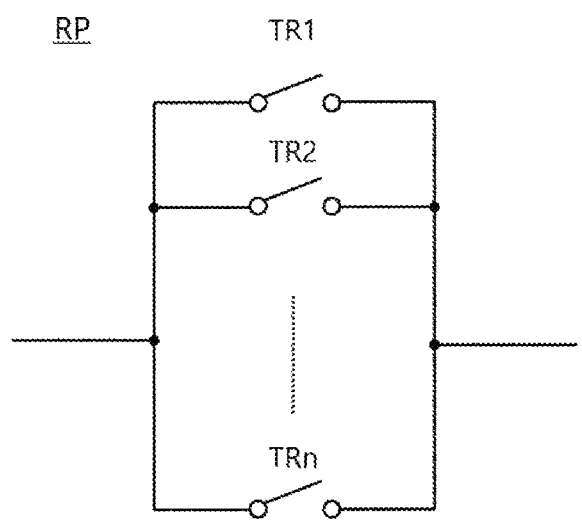
FIG. 8 is a configuration diagram of a resistive element according to an embodiment.

FIG. 8 is a configuration diagram of a resistive element according to an embodiment. Referring to FIG. 8, the first resistive element (RP) may be composed of a plurality of transistors (TR1 to TRn) connected in parallel. Here, the transistors (TR1 to TRn) may have a constant resistance value when turned on.

The touch driving device may determine the resistance value of the first resistive element (RP) by adjusting the number of transistors that are turned on among the plurality of transistors (TR1 to TRn).

Figure 9:
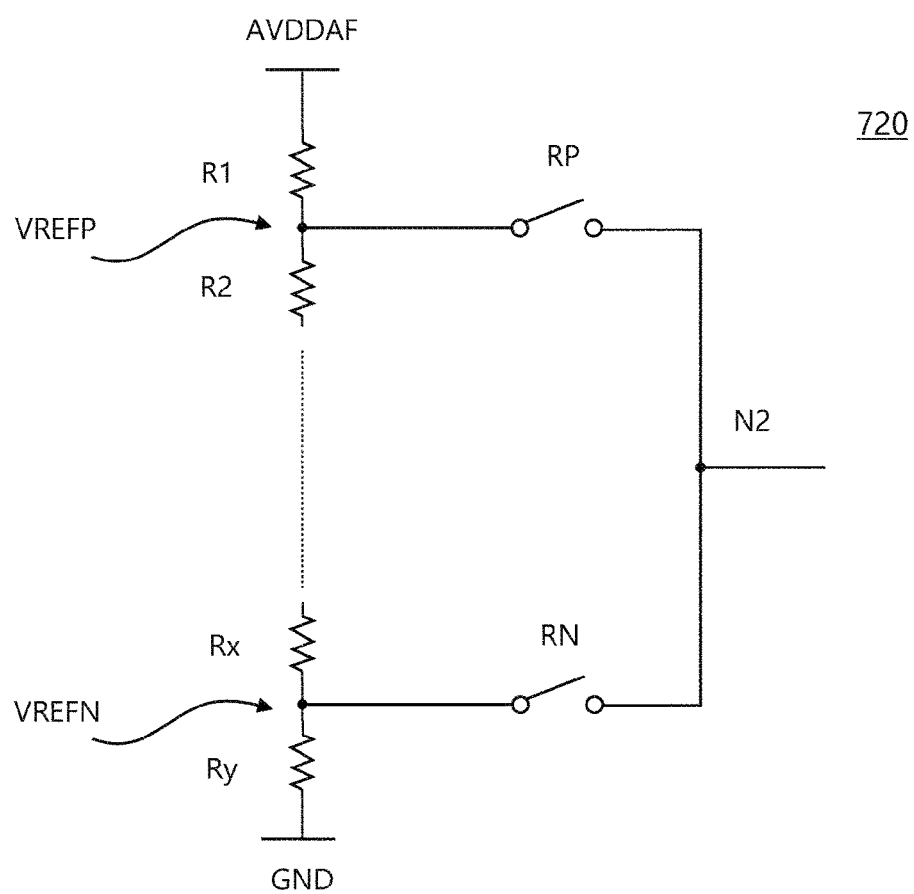
FIG. 9 is an example configuration diagram of a driving support circuit according to an embodiment.

FIG. 9 is an example configuration diagram of a driving support circuit according to an embodiment.

Referring to FIG. 9, the driving support circuit 720 may include resistance strings (R1, R2 . . . Rx, Ry) disposed between the high driving voltage (AVDDAF) and the low driving voltage (GND).

Additionally, the driving support circuit 720 may use one node of the resistance string (R1, R2 . . . Rx, Ry) as a voltage source (VREFP, VREFN).

Additionally, the driving support circuit 720 may change the voltage level of the voltage sources (VREFP, VREFN) by changing the position of the node used as the voltage source (VREFP, VREFN) in the resistance string (R1, R2 . . . Rx, Ry).

Figure 10:
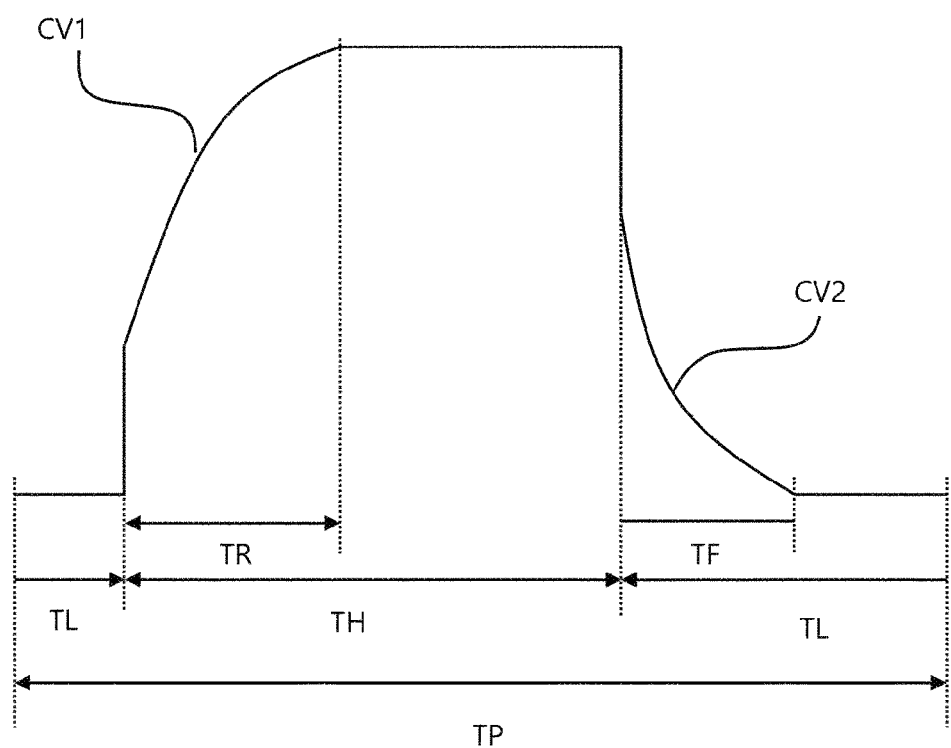
FIG. 10 is a diagram illustrating the waveform of a touch driving pulse according to one embodiment.

FIG. 10 is a diagram illustrating the waveform of a touch driving pulse according to one embodiment.

Referring to FIG. 10, the touch driving pulse may have a section (TH) with a high voltage level and a section (TL) with a low voltage level in one cycle (TP).

The auxiliary signal may be driven according to the timing of the rising edge of the PWM driving pulse and may be driven in a portion (TR) of the section (TH) having a high voltage level. The auxiliary signal may be driven to the extent that completes the function of charging the parasitic capacitor. At this time, a part of the rising waveform of the touch driving pulse may form a curved waveform (CV1) based on the RC time constant due to the auxiliary signal.

The auxiliary signal may be driven according to the timing of the falling edge of the PWM driving pulse. The auxiliary signal may be driven in a partial section (TF) of the section (TL) having a low voltage level. The auxiliary signal may be driven to the extent that completes the function of discharging the parasitic capacitor. At this time, a portion of the falling waveform of the touch driving pulse may form a curved waveform (CV2) based on the RC time constant by the auxiliary signal.

Figure 11:
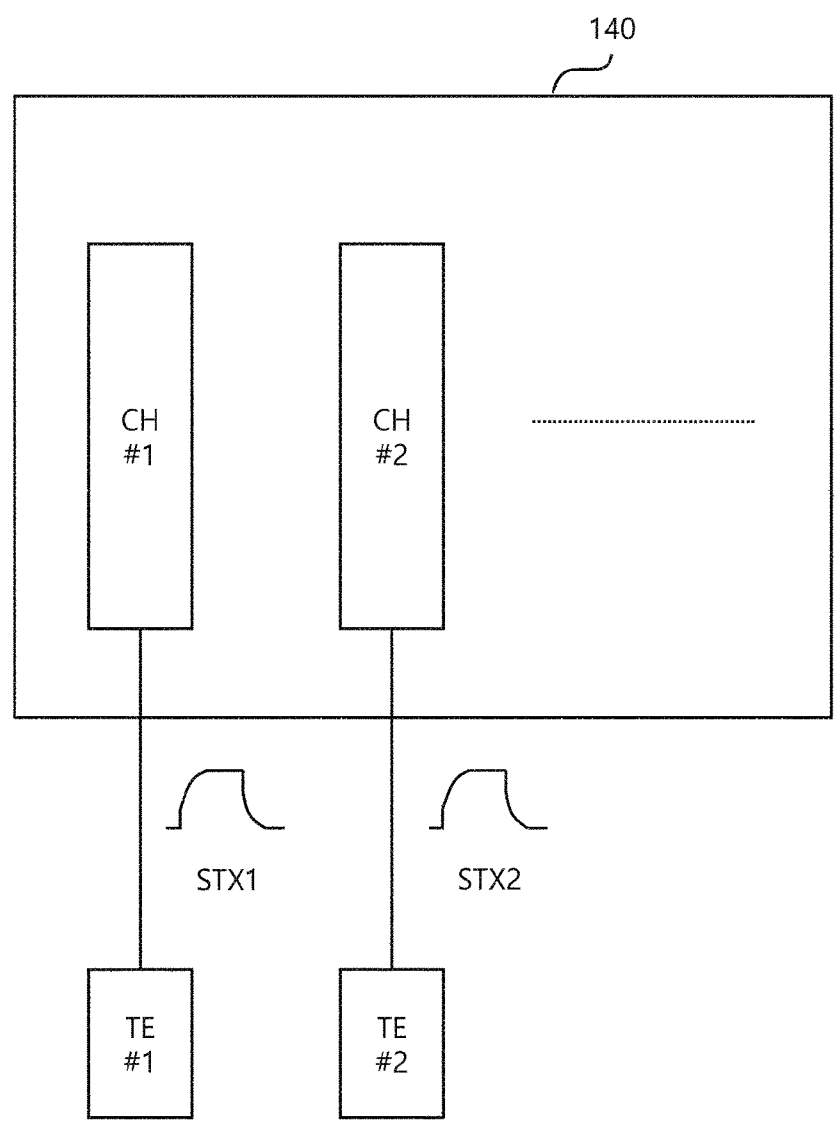
FIG. 11 is a diagram illustrating a plurality of channel circuits disposed in a touch driving device according to an embodiment.

FIG. 11 is a diagram illustrating a plurality of channel circuits disposed in a touch driving device according to an embodiment.

Referring to FIG. 11, the touch driving device 140 may include a plurality of channel circuits (CH #1, CH #2, . . . ).

The first channel circuit (CH #1) may supply first touch driving pulses (STX1), in which part of the rising waveform or falling waveform becomes a curved waveform based on the RC time constant, to the first touch electrode (TE #1). The first channel circuit (CH #1) may generate touch sensing data for the first touch electrode (TE #1) according to the response signal to the first touch driving pulses (STX1).

And, the second channel circuit (CH #2) may supply second touch driving pulses (STX2), in which part of the rising waveform or falling waveform becomes a curved waveform based on the RC time constant, to the second touch electrode (TE #2). And, the second channel circuit (CH #2) may generate touch sensing data for the second touch electrode (TE #2) according to the response signal to the second touch driving pulses (STX2).

A plurality of channel circuits (CH #1, CH #2, . . . ) may receive PWM driving pulses from the external, and combine the PWM driving pulses with an auxiliary signal with a curved waveform to generate a touch driving pulse (STX1, STX2, . . . ).

Each channel circuit (CH #1, CH #2, . . . ) may have differences in characteristics. The causes of the deviation may vary. For example, the positions of the touch electrodes (TE #1, TE #2, . . . ) within the touch panel may be different and the size of the parasitic capacitance of the touch electrodes (TE #1, TE #2, . . . ) may be different depending on the surrounding electrodes, which may cause the deviation.

To compensate for the deviation, the touch driving device may adjust the parameters of each channel circuit (CH #1, CH #2, . . . ) so that the RC time constant in the curved waveform of the touch driving pulses (STX1, STX2, . . . ) may be adjusted differently. Here, the parameters may be, for example, the voltage level of the voltage source of the driving support circuit and the resistance value of the resistive element.

Meanwhile, the touch driving device may operate in conjunction with an external device.

Figure 12:
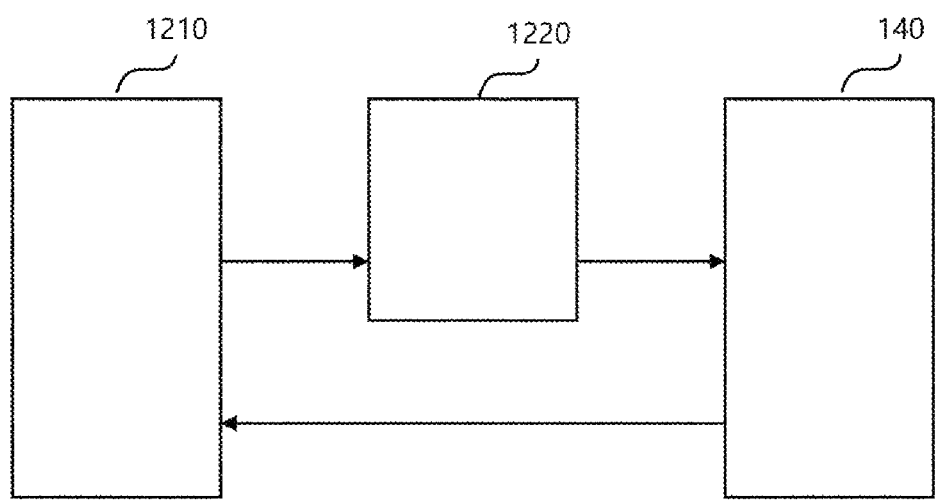
FIG. 12 is a configuration diagram of a touch driving system according to an embodiment.

FIG. 12 is a configuration diagram of a touch driving system according to an embodiment.

Referring to FIG. 12, the touch driving system 1200 may include an MCU 1210, a TPIC 1220, a touch driving device 140, etc.

The MCU 1210 may control the driving timing within the touch driving system 1200 and generate touch coordinates for the touch panel by analyzing touch sensing data.

The MCU 1210 may transmit control signals such as a synchronization signal to the TPIC 1220. In addition, TPIC 1220 may generate PWM driving pulses according to the control signal and output the PWM driving pulses to the touch driving device 140.

Then, the touch driving device 140 may generate touch driving pulses by adding an auxiliary signal generated using a voltage source and a resistive element to the PWM driving pulses, supply the touch driving pulses to the touch electrode, and respond to the touch electrode. Touch sensing data generated according to the signal may be output.

The touch driving device 140 may include a plurality of channel circuits that generate touch driving pulses. Among these plural channel circuits, the first channel circuit and the second channel circuit may have different characteristics. The touch driving device 140 may have different waveforms of the auxiliary signals of the first channel circuit and the second channel circuit to compensate for the characteristic deviation.

Since the touch driving device 140 receives PWM driving pulses from the TPIC 1220, the PWM driving pulses used in each channel circuit may be the same. Therefore, the first channel circuit and the second channel circuit may use the same PWM driving pulses and generate touch driving pulses of different waveforms by forming only the waveform of the auxiliary signal differently.

In this case, the first channel circuit and the second channel circuit may modify the waveform of the auxiliary signal by adjusting the voltage level of the voltage source or the resistance value of the resistive element. The control signal for this adjustment may be sent by the MCU (1210).

As described above, the sensitivity of touch sensing may be increased by minimizing the influence of parasitic capacitors formed around the touch electrode.

What is claimed is:

1. A touch driving device comprising:
a first channel circuit configured to supply a plurality of first touch driving pulses having a curved waveform in accordance with a first RC time constant to a first touch electrode, and generate touch sensing data for the first touch electrode according to a response signal for the plurality of first touch driving pulses; and
a second channel circuit configured to supply a plurality of second touch driving pulses having a curved waveform in accordance with a second RC time constant to a second touch electrode, and generate touch sensing data for the second touch electrode according to a response signal for the plurality of second touch driving pulses,
wherein the first channel circuit is configured to generate an auxiliary signal having the curved waveform in accordance with the first RC time constant using a driving support circuit configured of a voltage source and a resistive element.

2. The touch driving device of claim 1, wherein the first channel circuit is configured to receive Pulse Width Modulation (PWM) driving pulses from an external circuit, and combine the PWM driving pulses with the auxiliary signal having the curved waveform in accordance with the first RC time constant to generate the first touch driving pulses.

3. The touch driving device of claim 1, wherein the voltage source is a node of a resistance string disposed between a high driving voltage and a low driving voltage.

4. The touch driving device according to claim 3, wherein the driving support circuit is configured to adjust a voltage level of the voltage source by changing a position of a node used as the voltage source in the resistance string.

5. The touch driving device of claim 1, wherein the resistive element is comprised of at least one transistor, and a resistance value of the resistive element is determined according to a number of transistors that are turned on among the at least one transistor.

6. The touch driving device of claim 2, wherein the first channel circuit is configured to generate the auxiliary signal having the curved waveform in accordance with the first RC time constant using a rising driving support circuit configured of a high voltage source and a first resistance element and a falling driving support circuit configured of a low voltage source and a second resistance element.

7. The touch driving device of claim 1, wherein the first RC time constant of the curved waveform in the first channel circuit is different from the second RC time constant of the curved waveform in the second channel circuit, and
wherein at least one of the first RC time constant or the second RC time constant is applied to a portion of a rising waveform or a failing waveform.

8. The touch driving device of claim 2, wherein a position of the first touch electrode is different from a position of the second touch electrode in a touch panel, and wherein, depending on peripheral electrodes, a parasitic capacitance of the first touch electrode is different from a parasitic capacitance of the second touch electrode.

9. A touch driving device comprising:
a first circuit configured to supply Pulse Width Modulation (PWM) driving pulses to a sensing line connected to a touch electrode;

a second circuit configured to supply an auxiliary signal generated using a voltage source and a resistive component to the sensing line; and a third circuit configured to generate touch sensing data for the touch electrode according to a response signal to the PWM driving pulses.

10. The touch driving device of claim 9, further comprising a fourth circuit configured to transmit the touch sensing data for the touch electrode to a touch coordinate calculation device.

11. The touch driving device of claim 9, wherein the second circuit includes a first subcircuit consisting of a high voltage source and a first resistance element, and a second subcircuit consisting of a low voltage source and a second resistance element.

12. The touch driving device of claim 11, wherein the first subcircuit is configured to be driven in accordance with a timing of a rising edge of the PWM driving pulses, and the second subcircuit is configured to be driven in accordance with a timing of a falling edge of the PWM driving pulses.

13. The touch driving device of claim 11, wherein the first subcircuit is configured to be driven in a part of a time period in which the PWM driving pulses indicate a high voltage level, and the second subcircuit is configured to be driven in a part of a time period in which the PWM driving pulses indicate a low voltage level.

14. The touch driving device of claim 9, wherein the first circuit is configured to supply the PWM driving pulses to a first node of the sensing line, and the second circuit is configured to supply the auxiliary signal to a second node formed between the touch electrode and the first node in the sensing line.

15. The touch driving device of claim 9, further comprising a fifth circuit configured to set a voltage level of the voltage source and a resistance value of the resistive element.

16. A touch driving device comprising:

a first circuit configured to output Pulse Width Modulation (PWM) driving pulses;

a second circuit configured to generate touch driving pulses by adding an auxiliary signal generated based on a voltage source and a resistive element to the PWM driving pulses, supply the touch driving pulses to a touch electrode, and generate and output touch sensing data in response to a response signal of the touch electrode; and a third circuit configured to analyze the touch sensing data and generate touch coordinates for a touch panel.

17. The touch driving device of claim 16, wherein the second circuit includes a plurality of channel circuits configured to generate the touch driving pulses, and wherein a waveform of the auxiliary signal in a first channel circuit and a waveform of the auxiliary signal in a second channel circuit, among the plurality of channel circuits, are different from each other.

18. The touch driving device of claim 17, wherein the first channel circuit and the second channel circuit are configured to use the same PWM driving pulses, and generate the touch driving pulses of different waveforms by forming different waveforms of the auxiliary signal.

19. The touch driving device of claim 17, wherein the first channel circuit and the second channel circuit are configured to modify the waveforms of the auxiliary signal by adjusting at least one of a voltage level of the voltage source or a resistance value of the resistive element.

* * * * *